(12) United States Patent
Livingston et al.

(10) Patent No.: US 7,897,102 B2
(45) Date of Patent: Mar. 1, 2011

(54) METHOD OF MAKING VALVE GUIDE BY POWDER METALLURGY PROCESS

(75) Inventors: Howard M. Livingston, Long Grove, IL (US); C. Bruce Blackwell, Carmel, IN (US)

(73) Assignee: Helio Precision Products, Inc., Lake Bluff, IL (US)

( * ) Notice: Subject to any disclaimer, the term of this patent is extended or adjusted under 35 U.S.C. 154(b) by 1479 days.

(21) Appl. No.: 10/928,834

(22) Filed: Aug. 27, 2004

(65) Prior Publication Data

US 2006/0045786 A1    Mar. 2, 2006

(51) Int. Cl.
 *B22F 1/00* (2006.01)
(52) U.S. Cl. ............................................ 419/38; 75/230
(58) Field of Classification Search ............... 419/38, 419/23, 6; 75/231, 243, 230; 428/554
See application file for complete search history.

(56) References Cited

U.S. PATENT DOCUMENTS

| | | | | |
|---|---|---|---|---|
| 3,689,964 | A | * | 9/1972 | Reen ............................... 419/27 |
| 4,050,143 | A | * | 9/1977 | Aslund ........................... 419/23 |
| 4,976,915 | A | | 12/1990 | Kuroki |
| 5,654,106 | A | | 8/1997 | Purnell et al. |
| 6,080,358 | A | | 6/2000 | Oba et al. |
| 6,221,813 | B1 | | 4/2001 | Riedel et al. |
| 6,599,345 | B2 | | 7/2003 | Wang et al. |

FOREIGN PATENT DOCUMENTS

| | | | |
|---|---|---|---|
| GB | 2 012 654 A | | 8/1979 |
| JP | 05078710 A | * | 3/1993 |
| JP | 10061417 | * | 3/1998 |

OTHER PUBLICATIONS

European Search Report, dated Nov. 25, 2005 issued for European patent application counterpart of above application.

* cited by examiner

*Primary Examiner* — Emily M. Le
*Assistant Examiner* — Weiping Zhu
(74) *Attorney, Agent, or Firm* — Gerald K. White

(57) ABSTRACT

A powder metallurgy method for making valve guides for use in internal combustion engines advantageously utilizes uniaxial side pressing to form compacts. Such compacts are subsequently sintered, formed into a cylindrical shape, and then hollowed to form a valve guide. The valve guides exhibit improved uniformity and density and hardness from end to end of the valve guide when contrasted to powder metal valve guides formed with uniaxial end pressing.

8 Claims, No Drawings

METHOD OF MAKING VALVE GUIDE BY POWDER METALLURGY PROCESS

FIELD OF INVENTION

This invention relates to a powder metallurgy process for producing valve guides having improved uniformity of density and improved uniformity of mechanical properties, such as hardness, when contrasted to valve guides manufactured by prior powder metallurgy processes. The process utilizes uniaxial side pressure only during the compaction of metal powders to attain improved uniformity of density and mechanical properties of the resultant valve guide.

BACKGROUND OF THE INVENTION

Valve guides are press fit into smaller diameter cylindrical mating bores contained in internal combustion engine heads to obtain a stable fit between the two components. A stable fit is desirable to prevent subsequent loosening during operation of the engine and to facilitate heat transfer between the components. Thus, it may be appreciated that end-to-end uniformity in density and mechanical properties, such as hardness, of a valve guide is a desirable characteristic. Clearly, increased uniformity leads to improved installation and operation of valve guides.

Blanks for subsequent fabrication into valve guides for use in internal combustion engines have been formed by powder metallurgy processes or have been formed from cast or wrought metal. The present invention relates to an improved powder metallurgy process for making valve guide blanks having improved uniformity in properties.

Powder metallurgy, in general, involves producing metal powders and then utilizing such powders to make desired products. Powder metallurgy processes generally comprise heating a compact formed by a compression of powder metal. Such heating is termed "sintering" and usually does not involve fusion, or at least a major amount of fusion.

Prior powder metallurgy processes for making valve guides generally involve placing metal powders within elongated, cylindrical molds, optionally containing a core rod; applying pressure to the powder through pressure transmission from the top and/or the bottom of the mold (hereinafter referred to as "uniaxial end pressing") to cause compaction of the powder into the shape of a hollow cylinder; heating the compacted powder to an elevated sintering temperature to cause the compacted powder to bond and form a hollow, cylindrical sintered blank; and then forming the elongated surface of the blank to produce a valve guide. A shape limitation results from the necessity of applying pressure from the top and bottom of the mold, rather than from the side. During the application of pressure, almost no lateral flow of powder is created; and accordingly, desired shapes are limited by such flow characteristic. Holes parallel to the longitudinal axis of the mold can readily be made with the use of a core rod, if desired, but holes perpendicular to such axis must be machined following compacting and sintering. Uniaxial side pressing thus precludes the use of a core rod to form a hollow center in the blank because such hollow center would be perpendicular to the longitudinal axis of the mold. A typical prior art powder metallurgy process for making valve guides is illustrated in U.S. Pat. No. 6,599,345.

The above-described uniaxial end pressing of the prior art involves significant limitations because metal powders tend to cling to the sides of the mold and thereby result in unequal pressure throughout the body of powder metal. Thus, parts formed by applying pressure at both ends of the mold are usually less dense in the middle of the resultant hollow sintered blank. Thus, non-uniform density and non-uniform mechanical properties are created in the blank and resultant valve guide. Metal powders under pressure do not flow like fluids. The powders do not tend to flow, for example, from a region of high compression to one of low compression; and as a consequence, the depth-width ratio is extremely important in the dies used in the process. The manufacture of compacts of about four inches in length or greater becomes very difficult because of pressing force limitations associated with commercial pressing operations. Similar pressing force limitations are encountered when attempting to press compact diameters of about ⅝ inches or more. Consequently, the above-described uniaxial end pressing process has major limitations when relatively large valve guides are desired.

The above-mentioned limitations of the prior art are addressed and improved by the process and product of the present invention in a straightforward and effective manner. Rather than applying compacting pressure in a direction parallel to the longitudinal axis of the mold (uniaxial end pressing), compacting pressure is applied solely in a side direction substantially perpendicular to the longitudinal axis of the metal powder filled mold (uniaxial side pressing). A pressing apparatus may be used to apply pressure in one side direction only or in two opposed side directions. Uniaxial side pressing eliminates lower density at the mid-length of the pressed compact that is characteristic of uniaxial end pressing because pressing forces are exerted from a different direction, and the length of material in the pressing direction is sufficiently short so as to not encounter substantial density and hardness variation throughout the cross-section of the pressed compact. Obviously, end-to-end variation in density and hardness is minimized by the process of the invention because pressure is not applied to the ends of the mold. In addition, there is no problem in making compacts of about four inches or more in length or compacts having diameters of about ⅝ inches or more. Uniaxial side pressing involves another advantage because it becomes a routine procedure to make compacts of a master length and then cut such compacts into desired blank lengths for subsequent processing into valve guides. Such master length process thereby reduces the number of pressing and sintering operations required to manufacture a given number of valve guides.

Applicant does not believe that it has invented uniaxial end pressing in a general sense because such technique is found in the art. Please see U.S. Pat. Nos. 4,976,915; 6,080,358; and 6,221,813 in this regard. However, Applicant believes that its contribution to the art lies in advantageously adapting such technique to the manufacture of valve guides in a manner having significant advantages when contracted with prior valve guide manufacturing processes.

Above-mentioned U.S. Pat. No. 6,599,345 discloses at column 5, lines 36 and 37 that compaction can be performed either uniaxially or isostatically. No further explanation is offered to expressly define the meaning of uniaxial pressing. However, the disclosure at column 6, lines 13-58 makes it apparent that uniaxial end pressing, rather than uniaxial side pressing, is contemplated by the patent. Applicant believes that the above conclusion is supported by the presence of an inner bore in the intermediate product prior to forming the valve guide. Such presence of an inner bore means that the bore must have been created during the compaction step and further that uniaxial end pressing would necessarily have been applied. One would not utilize uniaxial side pressing to make a hollow centered intermediate product because valve guides require exact centering and circular shape due to the intended use and function in an internal combustion engine.

Uniaxial side pressing does not lead to sufficient specificity as to where the center will ultimately be located in the final product to warrant an attempt to produce a hollowed blank. Thus, in the present invention, following uniaxial side pressing and sintering, a solid blank is produced; formed into the desired circular shape; and a center hole then formed. When uniaxial end pressing is utilized, the intended center can be determined more exactly because the applied pressure is parallel, rather than perpendicular, to the longitudinal axis of the mold. Thus, a hollow blank may be formed at the compaction stage. In any event, the process of the invention utilizes uniaxial side pressing to produce a solid—not hollowed—intermediate blank product which is later formed into a valve guide by forming into a round shape and then forming an open central portion in the intermediate product. It is evident that the respective valve guide manufacturing processes are quite distinct.

SUMMARY OF THE INVENTION

The present invention relates to a method of making a valve guide for use in an internal combustion engine. The method comprises placing a metal powder within an elongated cylindrical-shaped mold having an elongated axis; then applying uniform uniaxial pressure to such powder-filled mold only in a direction substantially perpendicular to the longitudinal axis of the mold to form the powder into an elongated, generally cylindrical solid compact; and then sintering the compact to bond the compacted powder and form a solid elongated sintered metal blank having a generally cylindrical cross-section and having generally uniform density and hardness. Following the sintering step, the sintered blank is formed into an essentially round shape. Finally, a center hole is formed in the valve guide by, for example, drilling.

The intermediate solid product produced by the process of the present invention comprises an elongated, cylindrical sintered powder metal valve guide blank characterized by substantially uniform density and hardness from end to end and having a solid cross-section.

The final product produced by the process of the present invention comprises an elongated, cylindrical valve guide having a hollow center portion comprising a sintered metal having substantially uniform density and hardness from end to end.

DETAILED DESCRIPTION OF THE INVENTION

Valve guides are typically hollow metal cylinders that are installed in internal combustion engine heads as axial bearings for valve stems. The guides serve to hold the valve face coaxial to the head or block seat and also serve as a heat sink to cool the valves. The most common installation procedure is to secure the valve guide through a press fit between the valve guide and the cylindrical mating bore.

Valve guides are made from ferrous metals, such as pearlitic cast iron, and non-ferrous metals, such as bronze. Guides are manufactured using cast, wrought, or pressed and sintered powder metal processes. All of such metals, as well as other metals and composites, are within the scope of the present invention.

The powder metallurgy process of the present invention may be generally conducted as described below.

A powder metal blend or mixture is thoroughly mixed for a sufficient time to achieve a homogeneous mixture. Conventional mixing means, such as a ball mill, rod mill, rotary blade mixer, etc., may be utilized. Typically, on the order of about one to three hours of mixing time is sufficient to achieve the desired homogeneous mixture.

Following the mixing step, the mixed metal powder is placed within an elongated, cylindrical-shaped mold having a longitudinal axis.

The metal powder filled mold is then subjected to sufficient pressure to be adequate to press and form a generally cylindrical, solid compact. Pressures on the order of about 25 TSI (tons per square inch) to about 60 TSI, or higher, are adequate to form the desired compact. The mixture is compacted with use of uniform uniaxial side pressure to form a pressed compact. Conventional uniaxial side pressing equipment is suitable for the compacting step. While generally cylindrical in shape, the solid, non-hollowed pressed compact may exhibit some surface irregularities and may be off-round following the pressing operation. Clearly, additional shaping steps are necessary to achieve the required, precise configuration of a valve guide. The powder metal compact exhibits substantial uniformity of density along its length with the ends and mid-portions of the pressed compact having essentially the same density because pressure is applied over a short distance (the diameter, rather than the length, of the cylindrical mold).

Following the compaction step, the compact is sintered in a conventional sintering furnace using conventional sintering temperatures ranging on the order from about 800° C. to about 1350° C. for ferrous powder metals and ranging on the order from about 700° C. to about 900° C. for non-ferrous materials. Sintering times typically range on the order from about ten minutes to about one hour. The sintering process serves to bond of adjacent powder surfaces in the compact and thereby form an integrally sintered mass. Sintering furnace atmospheres may be performed in a reducing atmosphere, an inert atmosphere, or under vacuum. The sintered product is a solid elongated sintered metal blank having a generally cylindrical cross section and characterized by generally uniform density and hardness from end to end. As in the case of the pressed compact, the sintered blank remains off round and has surface ridges. Again further shaping is required to produce a finished valve guide.

Following the sintering step, the longitudinal external surface of the generally cylindrical blank is formed to obtain a desired essentially round shape, a desired diameter, and a desired surface texture. Forming may be accomplished by, for example, but not limited to, grinding, turning, milling, broaching, or passage through a die. Such forming process may include one or more of the above-mentioned forming techniques. For example, the blank may be first broached and then ground to form the desired round shape. Grinding may be performed using known techniques such as centered grinding, centerless grinding, etc. It is also contemplated that multiple grinding wheels may be employed.

Following the formation of a round shape, a center hole of desired diameter is then formed in the semi-finished blank to produce a hollowed valve guide. Drilling constitutes a typical type of hole formation. The finished product comprises an elongated, cylindrical powder metal valve guide having a hollow center portion. The valve guide comprises sintered metal having substantially uniform density and hardness from end to end.

The valve guide of the invention may be used in the as-sintered condition or in the heat-treated condition. Suitable heat treating processes include but are not limited to nitriding, carburizing, carbonitriding, steam treating, tempering, etc. The valve guide may optionally be impregnated with an oil to facilitate operation under a thin film or boundary lubrication regime. Such oil fills pores in the powder metal valve guide and serves as a reservoir to provide continuous lubrication during application and also improves machinability during manufacture.

In addition to being able to obtain uniform hardness from end to end, regardless of length, the present invention has yet another advantageous aspect related to the use of uniaxial side pressing. The use of uniaxial side pressing involves exerting pressure over a much shorter distance than that required when uniaxial end pressing is used. This means that the above-discussed length and diameter limitations of about four inches in length and about ⅝ inches in diameter for uniaxial end pressing are not encountered when uniaxial side pressing is employed. The absence of such restrictive conditions permits the production of significantly greater lengths and diameters. For example, one may easily produce lengths of four inches or more or diameters of ⅝ inches if desired. This newfound capability leads to the production of master length compacts, which may be cut into desired lengths for further processing or, alternatively, further processed and then cut into desired lengths. Obviously, two or more valve guide lengths may be achieved with use of only one uniaxial side pressing step. Cut lengths from uniaxial side pressed products are characterized by essentially uniform density and hardness from end to end. If a master length procedure were used for uniaxial end pressed products, variations in density and hardness would occur from end to end because the ends would be harder and denser than intermediate sections of the product.

As may be appreciated, use of the invention permits the production of lengths that cannot be achieved with unixial end pressing. Pressing apparatus to make such longer lengths would be prohibitively expensive and require further development should unixial end pressing be used. However with uniaxial side pressing, existing pressing apparatus may be used to achieve such longer lengths.

The practice of the present invention is further illustrated by the following example.

EXAMPLE

A homogenously mixed cast iron powder is placed within an elongated cylindrical shaped mold having a longitudinal axis. A uniform pressure of about 35 TSI is applied to the mold in a direction substantially perpendicular to the longitudinal axis, which causes the cast iron powder to become compacted and formed into an elongated, generally cylindrical, solid compact. The compact is sintered at a temperature of about 1000° C. for 30 which causes the compacted powder to become bonded and form a solid, elongated, sintered cast iron blank having generally cylindrical cross section and generally uniform density and hardness from end to end of the blank. The generally cylindrical blank is then ground to form an essentially round shape with use of centerless grinding apparatus, and then a center hole is formed in the ground blank to produce a valve guide characterized by substantially uniform density and hardness from end to end.

It is claimed:

1. A method of making a valve guide for use in an internal combustion engine comprising:
   (a) Placing a metal powder mixture within an elongated, cylindrical-shaped mold having a longitudinal axis;
   (b) Applying uniform uniaxial pressure to said powder-filled mold only in a direction substantially perpendicular to said longitudinal axis to cause said powder to be compacted and formed into an elongated, generally cylindrical, solid, non-hollowed compact;
   (c) Sintering said compact to bond said compacted powder, thereby forming a solid elongated sintered metal blank having a generally cylindrical solid, non-hollowed cross-section and having uniform density and hardness from end to end;
   (d) Forming said cylindrical sintered metal blank to form an essentially round shape; and
   (e) Drilling a center hole through said cross-section of said blank following said essentially round shape forming step to produce a valve guide having substantially uniform density and hardness from end to end.

2. The method of claim 1, wherein forming said essentially round shape forming step comprises broaching said cylindrical sintered metal blank and then grinding said cylindrical sintered metal blank.

3. The method of claim 1 further comprising utilizing a mold having sufficient length to produce a compact and resultant sintered blank having a length that is at least two times greater than a desired valve guide length; cutting said blank into at least two pieces; and forming at least two valve guides.

4. The method of claim 1, wherein said metal comprises a ferrous metal.

5. The method of claim 1, wherein said metal comprises a non-ferrous metal.

6. The method of claim 1, wherein said center hole is formed by drilling.

7. The method of claim 1, wherein said elongated solid, non-hollowed compact has a length of at least four inches.

8. The method of claim 1, wherein said elongated solid, non-hollowed compact has a diameter of at least ⅝ inches.

* * * * *